United States Patent
He et al.

(10) Patent No.: US 11,729,787 B2
(45) Date of Patent: Aug. 15, 2023

(54) BANDWIDTH PARTS FOR A UNICAST SIDELINK NETWORK

(71) Applicant: QUALCOMM Incorporated, San Diego, CA (US)

(72) Inventors: Linhai He, San Diego, CA (US); Seyedkianoush Hosseini, San Diego, CA (US); Wei Yang, San Diego, CA (US); Gavin Bernard Horn, La Jolla, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/248,332

(22) Filed: Jan. 20, 2021

(65) Prior Publication Data

US 2022/0232534 A1 Jul. 21, 2022

(51) Int. Cl.
*H04W 24/10* (2009.01)
*H04W 72/23* (2023.01)
*H04W 72/0453* (2023.01)
*H04W 72/543* (2023.01)

(52) U.S. Cl.
CPC ........... *H04W 72/23* (2023.01); *H04W 24/10* (2013.01); *H04W 72/0453* (2013.01); *H04W 72/543* (2023.01)

(58) Field of Classification Search
CPC ............... H04W 72/042; H04W 24/10; H04W 72/0453; H04W 72/087; H04W 72/02; H04W 92/18; H04L 5/0007; H04L 5/0044; H04L 5/0091
See application file for complete search history.

(56) References Cited

U.S. PATENT DOCUMENTS

2020/0288434 A1* 9/2020 Choi .................. H04L 5/0091
2021/0235432 A1 7/2021 Zhao et al.

FOREIGN PATENT DOCUMENTS

WO WO-2020082304 A1 4/2020
WO WO-2020145223 A1 7/2020

OTHER PUBLICATIONS

International Search Report and Written Opinion—PCT/US2021/062659—ISA/EPO—dated Apr. 7, 2022.

* cited by examiner

*Primary Examiner* — Dady Chery
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information to configure a sidelink channel, to be utilized by the UE to conduct unicast sidelink communication, with a plurality of bandwidth parts. The UE may transmit or receive data based at least in part on the plurality of bandwidth parts. Numerous other aspects are provided.

30 Claims, 9 Drawing Sheets

BANDWIDTH PARTS FOR A UNICAST SIDELINK NETWORK

FIELD OF THE DISCLOSURE

Aspects of the present disclosure generally relate to wireless communication and to techniques and apparatuses for providing bandwidth parts for a unicast sidelink network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors operatively coupled to the memory, the memory and the one or more processors configured to: receive configuration information to configure a sidelink channel, to be utilized by the UE to conduct unicast sidelink communication, with a plurality of bandwidth parts; and transmit or receive data based at least in part on the plurality of bandwidth parts.

In some aspects, a method of wireless communication performed by a UE includes receiving configuration information to configure a sidelink channel, to be utilized by the UE to conduct unicast sidelink communication, with a plurality of bandwidth parts; and transmitting or receiving data based at least in part on the plurality of bandwidth parts.

In some aspects, a non-transitory computer-readable medium storing a set of instructions for wireless communication includes one or more instructions that, when executed by one or more processors of a UE, cause the UE to: receive configuration information to configure a sidelink channel, to be utilized by the UE to conduct unicast sidelink communication, with a plurality of bandwidth parts; and transmit or receive data based at least in part on the plurality of bandwidth parts.

In some aspects, an apparatus for wireless communication includes means for receiving configuration information to configure a sidelink channel, to be utilized by the UE to conduct unicast sidelink communication, with a plurality of bandwidth parts; and means for transmitting or receiving data based at least in part on the plurality of bandwidth parts.

Aspects generally include a method, apparatus, system, computer program product, non-transitory computer-readable medium, user equipment, base station, transmitter, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
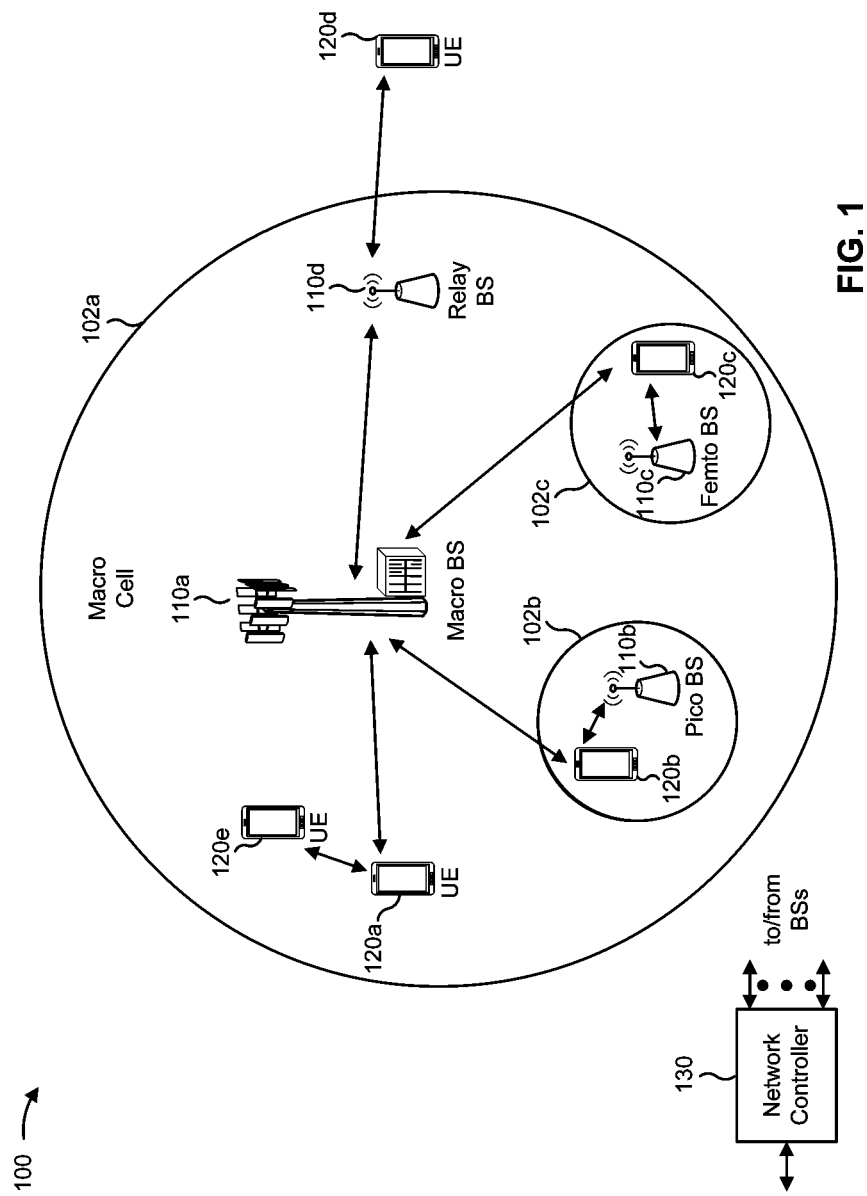
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs such as, for example, evolved or enhanced machine-type communication (eMTC) UEs and/or massive machine-type communication (mMTC) UEs. MTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
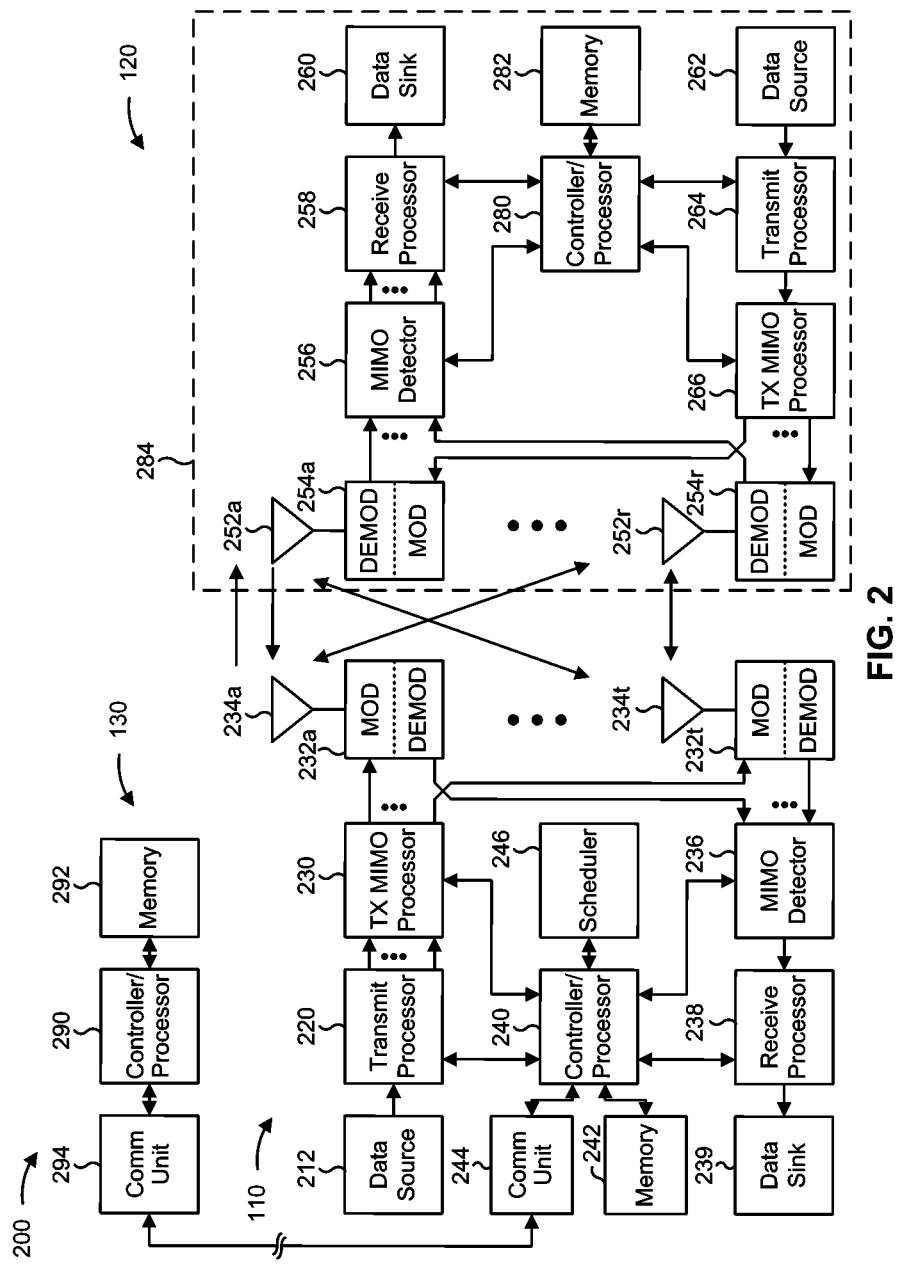
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110, controller/processor 280 of UE 120, and/or any other component(s) of FIG. 2 may perform one or more techniques associated with providing bandwidth parts for a unicast sidelink network, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, interpreting the instructions, and/or the like.

In some aspects, a UE (e.g., UE 120) includes means for receiving configuration information to configure a sidelink channel, to be utilized by the UE to conduct unicast sidelink communication, with a plurality of bandwidth parts; and means for transmitting or receiving data based at least in part on the plurality of bandwidth parts. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for performing carrier sensing associated with utilization of a sidelink resource of the sidelink channel prior to transmitting or receiving the data based at least in part on the plurality of bandwidth parts.

In some aspects, the UE includes means for switching from utilizing an active bandwidth part, actively utilized by the UE, to utilizing another bandwidth part based at least in part on an expiration of an inactivity timer.

In some aspects, the UE includes means for switching from utilizing an active bandwidth part, actively utilized by the UE, to utilizing another bandwidth part based at least in part on a measure of quality associated with the unicast sidelink communication satisfying a threshold quality level.

In some aspects, the UE includes means for receiving, from a base station or a network node, a switching message for the UE to switch from utilizing an active bandwidth part, actively utilized by the UE, to utilizing another bandwidth part.

In some aspects, the UE includes means for switching from utilizing the active bandwidth part to utilizing the other bandwidth part based at least in part on receiving the network reconfiguration message or the SCI message.

In some aspects, the UE includes means for switching from utilizing the active bandwidth part to utilizing the other bandwidth part based at least in part on the index and the switch time.

In some aspects, the UE includes means for transmitting, based at least in part on receiving the switching message, an assistance information message indicating a preference to utilize a preferred bandwidth part.

In some aspects, the UE includes means for transmitting, based at least in part on receiving the switching message, a confirmation message or a rejection message associated with utilizing the other bandwidth part.

In some aspects, the UE includes means for receiving, from another UE, a switching message for the UE to switch from utilizing an active bandwidth part, actively utilized by the UE, to utilizing another bandwidth part.

In some aspects, the UE includes means for switching from utilizing the active bandwidth part to utilizing the other bandwidth part based at least in part on the index.

In some aspects, the UE includes means for transmitting, based at least in part on receiving the switching message, a confirmation message or a rejection message associated with utilizing the other bandwidth part.

In some aspects, the UE includes means for transmitting, to another UE, a switching message for the other UE to switch from utilizing an active bandwidth part, actively utilized by the other UE, to utilizing another bandwidth part.

In some aspects, the UE includes means for indicating to the other UE to switch from utilizing the active bandwidth part to utilizing the other bandwidth based at least in part on the index.

In some aspects, the UE includes means for receiving, from the other UE, a confirmation message or a rejection message associated with utilizing the other bandwidth part.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A sidelink network may include a base station and a plurality of UEs. The base station may communicate with each of the plurality of UEs via respective access links. The plurality of UEs may operate in sidelink modes to communicate (e.g., transmit and/or receive data) with one another via one or more sidelink channels.

In one sidelink mode (e.g., Mode-1 Resource Allocation Mode), the base station may configure and control utilization of sidelink resources (e.g., radio interface resources such as frequency resources and/or time resources) accessible for sidelink communication. For instance, the base station may configure a predetermined number of sidelink resources, associated with a sidelink channel, and a transmitting UE may utilize the configured predetermined number of sidelink resources to transmit data to a receiving UE over the sidelink channel. The base station may be using the transmitting UE as a relay device to extend coverage to the receiving UE, which may be experiencing poor coverage due to, for example, a poor radio link quality. The base station may alternatively use a network node, deployed by an operator of the sidelink network, as the relay device.

In another sidelink mode (e.g., Mode-2 Resource Allocation Mode), the base station may configure the predetermined number of sidelink resources accessible for sidelink communication. The plurality of UEs, and not the base station, may control utilization of the predetermined number of sidelink resources by performing scheduling of communications in the sidelink network. For instance, the transmitting UE may autonomously schedule utilization of the predetermined number of sidelink resources to transmit data to the receiving UE.

In either sidelink mode, each of the plurality of UEs in the sidelink network may utilize a fixed amount of bandwidth due to utilizing the predetermined number of sidelink resources. As a result, regardless of an amount of data to be communicated, each of the plurality of UEs may utilize a threshold amount of processing power to perform communication operations (e.g., transmission or reception operations) associated with utilizing the predetermined number of sidelink resources for each communication. For instance, the transmitting UE may utilize a threshold amount of processing power to perform transmission operations associated with utilizing the predetermined number of sidelink resources for every transmission, including when the transmitting UE transmits a nominal amount of data. Similarly, the receiving UE may utilize a threshold amount of processing power to perform reception operations associated with utilizing the predetermined number of sidelink resources for every reception, including when the receiving UE receives the nominal amount of data.

Some UEs may be designed for efficient power consumption. Examples of such UEs include MTC UEs and/or NB-IoT devices that may be deployed in the field to perform, for example, infrequent and/or simple communication tasks, and may be provided with single-charge battery solutions. Additional examples include peripheral devices such as biometric sensors/devices or wearable devices (e.g., smart watches, smart clothing, smart glasses, smart wrist bands, smart ring, smart bracelet, or the like) that are sensitive to excessive power consumption. For such UEs, which can benefit from techniques that curtail power consumption, utilizing the threshold amount of processing power for performing the communication operations associated with utilizing the predetermined number of sidelink resources for each communication may be impracticable.

Further, because the plurality of UEs may not adjust a number of utilized sidelink resources (e.g., reduce the number of utilized sidelink resources for transmission/reception of, for example, the nominal amount of data), a plurality of sidelink resources may remain unutilized during communication of the nominal amount of data. As a result, resource utilization in the sidelink network may be rendered inefficient.

Various aspects of techniques and apparatuses described herein may allow provision of bandwidth parts for a sidelink network. A sidelink network that includes a transmitting UE communicating with a single receiving UE may be referred to as a unicast sidelink network. For a unicast sidelink network, the provision of bandwidth parts, as described herein, may assist in adjusting a number of utilized sidelink resources based at least in part on an operation of the UEs in the unicast sidelink network. For instance, provision of bandwidth parts may enable a transmitting UE to efficiently utilize sidelink resources based at least in part on amount of data to be communicated, thereby allowing unutilized sidelink resources to remain available for other purposes. Additionally, based at least in part on efficiently utilizing the sidelink resources, UEs designed for efficient power consumption may curtail power consumption associated with performing communication operations. As a result, the plurality of UEs may enable optimized resource utilization and optimized power consumption while communicating in the unicast sidelink network.

In some aspects, a UE may receive configuration information to configure a sidelink channel, to be utilized by the UE to conduct unicast sidelink communication, with a plurality of bandwidth parts, and may transmit or receive data based at least in part on the plurality of bandwidth parts.

Figure 3:
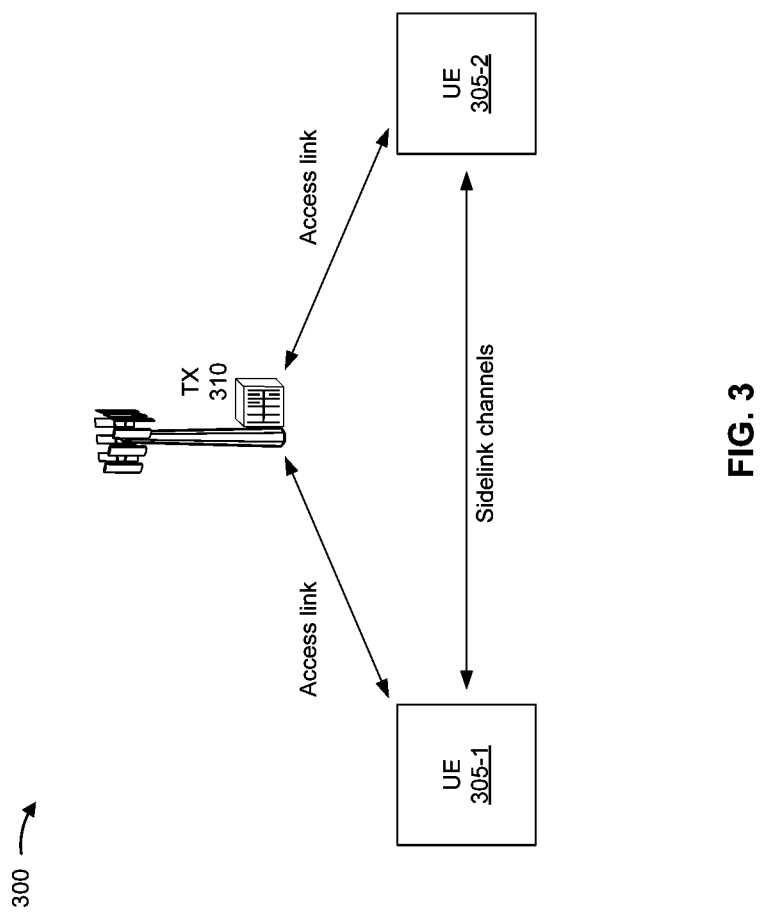
FIG. 3 is a diagram illustrating an example associated with providing bandwidth parts for a unicast sidelink network, in accordance with various aspects of the present disclosure.

FIG. 3 is a diagram illustrating an example 300 associated with providing bandwidth parts for a unicast sidelink network, in accordance with various aspects of the present disclosure. The unicast sidelink network may include a transmitter (TX) 310 and a plurality of UEs (shown as UE 305-1 and UE 305-2). The TX 310 may include, for example, a base station (e.g., BS 110) or a relay device. The relay device may include a network node such as, for example, a relay BS, a relay UE, and/or an integrated access and backhaul (IAB) node. As shown in FIG. 3, the UE 305-1 and the UE 305-2 may communicate (e.g., transmit and/or receive data) with one another via one or more sidelink channels in a sidelink mode. In the unicast sidelink network, a transmitting UE may communicate with a single receiving UE. The TX 310 may communicate with the UE 305-1 via a first access link and/or communicate with the UE 305-2 via a second access link. In some aspects, a sidelink channel between the UE 305-1 and the UE 305-2 may be implemented utilizing, for example, a PC5 interface, and an access link between the TX 310 and a UE (e.g., the UE 305-1 or the UE 305-2) may be implemented utilizing, for example, a Uu interface. Sidelink communications may be transmitted and received via the sidelink channels, and access link communications may be transmitted and received via the access links. The UE 305-1 and/or the UE 305-2 may include one or more UEs described elsewhere herein, such as UE 120 discussed with respect to FIG. 2.

As indicated above, FIG. 3 is provided as an example. Other examples may differ from what is described with respect to FIG. 3.

Figure 4:
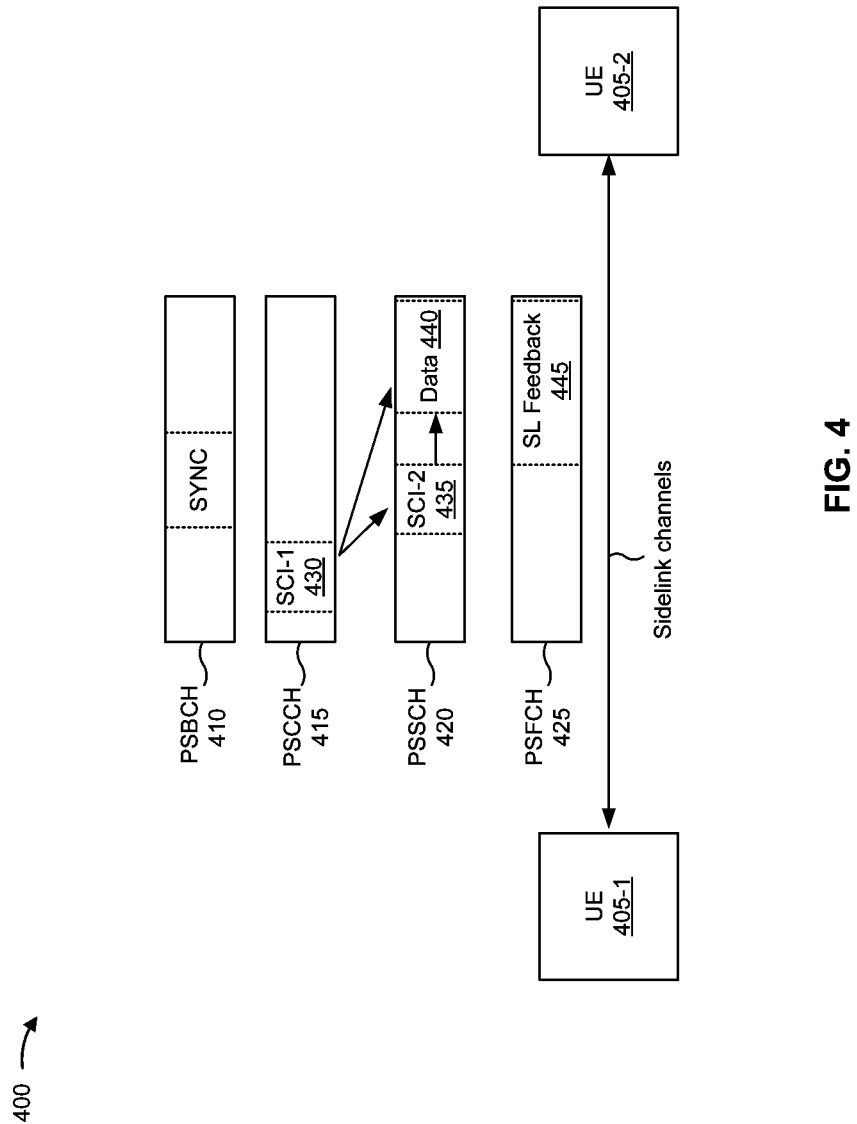
FIG. 4 is a diagram illustrating an example associated with providing bandwidth parts for a unicast sidelink network, in accordance with various aspects of the present disclosure.
Figure 5:
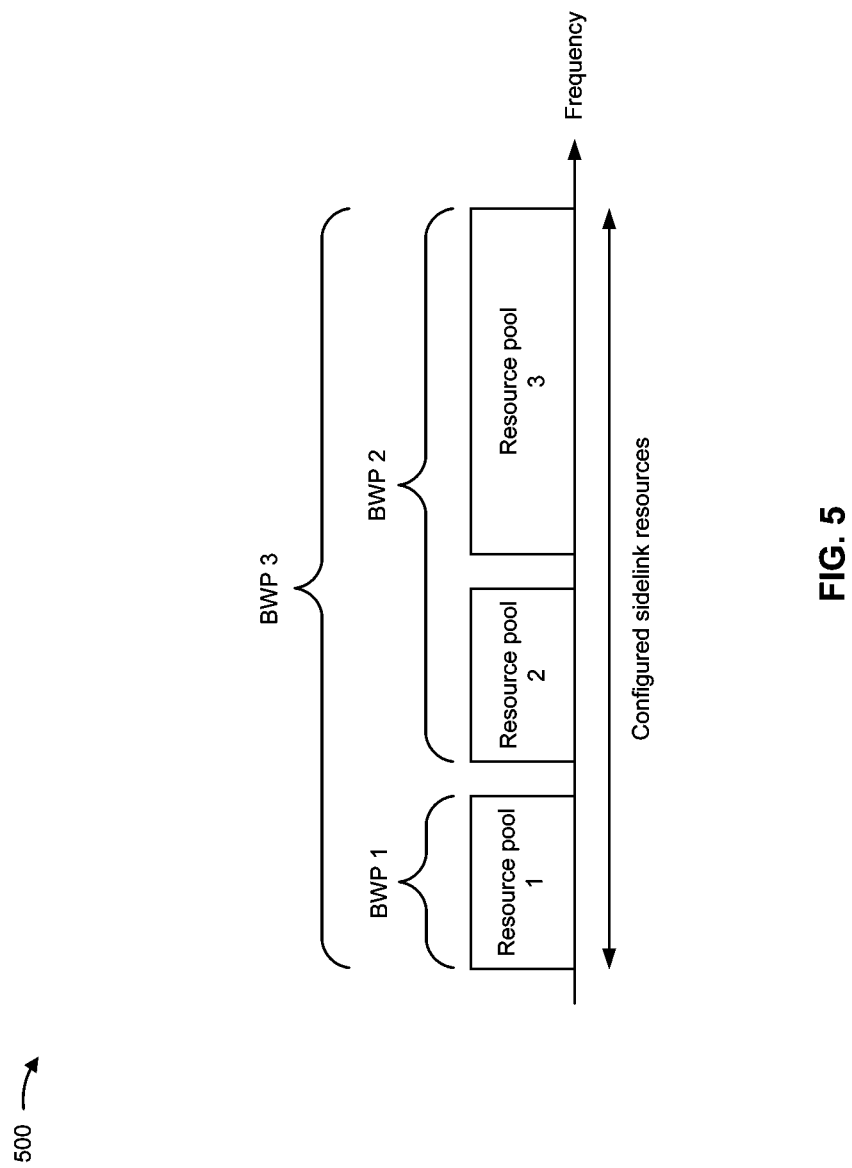
FIG. 5 is a diagram illustrating an example associated with providing bandwidth parts for a unicast sidelink network, in accordance with various aspects of the present disclosure.

FIGS. 4 and 5 are diagrams illustrating examples 400 and 500 associated with providing bandwidth parts for a unicast sidelink network, in accordance with various aspects of the present disclosure. As shown in FIG. 4, the unicast sidelink network may include a plurality of UEs including, for example, UE 405-1 and UE 405-2 communicating with each other using one or more sidelink channels. The plurality of UEs included in the unicast sidelink network may include a plurality of UEs within a given geographical area (e.g., a given radius around a given UE). In some aspects, the plurality of UEs within the given geographical area may provide a UE density (e.g., NSta) associated with the unicast sidelink network. For example, NSta may identify a number of UEs within a threshold distance of a UE. In some aspects, the UE 405-1 and/or the UE 405-2 may include one or more UEs described elsewhere herein, such as UE 120 discussed with respect to FIG. 2 and/or the UEs (e.g., UE 305-1 and/or UE 305-2) discussed with respect to FIG. 3.

As shown in FIG. 4, the UE 405-1 may communicate with the UE 405-2 via sidelink channels. Communications utilizing the one or more sidelink channels may include, for example, P2P communications, D2D communications, V2X communications (e.g., V2V communications, V2I communications, and/or vehicle-to-person (V2P) communications), and/or mesh networking communications.

In some aspects, the sidelink channels may use a PC5 interface and/or may operate in, for example, a high frequency band (e.g., the 5.9 GHz band) and/or an unlicensed or shared frequency band (e.g., an NR unlicensed (NR-U) frequency band). Additionally, or alternatively, the UEs 405-1, 405-2 may synchronize timing of transmission time intervals (TTIs) (e.g., frames, subframes, slots, and/or symbols) using global navigation satellite system (GNSS) timing.

As further shown in FIG. 4, the sidelink channels may include, for example, a physical sidelink broadcast channel (PSBCH) 410, a physical sidelink control channel (PSCCH) 415, a physical sidelink shared channel (PSSCH) 420, and/or a physical sidelink feedback channel (PSFCH) 425. The PSBCH 410 may be used to communicate sidelink synchronization (SYNC) signals. The PSCCH 415 may be used to communicate control information, similar to a physical downlink control channel (PDCCH) and/or a physical uplink control channel (PUCCH) used for cellular communications with a transmitter (e.g., TX 310) via an access link or an access channel. The PSSCH 420 may be used to communicate data, similar to a physical downlink shared channel (PDSCH) and/or a physical uplink shared channel (PUSCH) used for cellular communications with the transmitter (e.g., TX 310) via an access link or an access channel.

The sidelink channels may carry sidelink control information (SCI) to indicate various control information used for sidelink communications. The sidelink control information may include, for example, sidelink control information part 1 (SCI-1) 430 and sidelink control information part 2 (SCI-2) 435. The SCI-1 430 may be included in the PSCCH 415, and the SCI-2 435 may be included in the PSSCH 420. The SCI-1 430 may include a scheduling assignment regarding one or more resources of the sidelink channels (e.g., time resources, frequency resources, and/or spatial resources). The SCI-2 435 may include various types of information, such as, for example, a hybrid automatic repeat request (HARQ) process ID, a new data indicator (NDI) associated with the data 440, a unique identifier associated with a transmitting UE (a unique TX ID), a unique identifier associated with a receiving UE (a unique RX ID), and/or a channel state information (CSI) report trigger.

The PSSCH 420 may also include data 440 and information such as, for example, information for decoding sidelink communications on the PSSCH 420, a quality of service (QoS) priority value, a resource reservation period, a PSSCH demodulation reference signal (DMRS) pattern, an SCI format and/or a beta offset for sidelink control information part 2 (SCI-2) 435 transmitted on the PSSCH 420, a quantity of PSSCH DMRS ports, a medium access control (MAC) message including a MAC control element (MAC CE), and/or a modulation coding scheme (MCS). The MAC CE may include, for example, messages associated with utilization of bandwidth parts (BWPs) configured for the unicast sidelink network. For instance, the MAC CE may be used to communicate a confirmation message and/or a rejection message associated with utilization of the BWPs.

In some aspects, the UE 405-1 may transmit both the SCI-1 430 and the SCI-2 435. In some aspects, the UE 405-1 may transmit only SCI-1 430, in which case one or more types of the information that would otherwise be transmitted in the SCI-2 435 may be transmitted in the SCI-1 430 instead. The PSFCH 425 may be used to communicate sidelink (SL) feedback 445, such as, for example, HARQ feedback messages (e.g., acknowledgement or negative acknowledgement (ACK/NACK) information), transmit power control (TPC), and/or a scheduling request (SR).

In some aspects, the one or more sidelink channels may use configured sidelink resources (configured by, for example, TX 310) shared by the plurality of UEs. In some aspects, a scheduling assignment (e.g., included in SCI-1 430) may be transmitted in sub-channels using specific resource blocks (RBs) across time. In some aspects, data 440 (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions may be transmitted using non-adjacent RBs. In some aspects, the TX 310 may configure each UE in the unicast sidelink network with one or more BWPs to facilitate utilization of sidelink resources to conduct sidelink communication (e.g., transmitting and/or receiving data). For instance, the UE may utilize the one or more BWPs of a sidelink channel to transmit data to and/or receive data from another UE in the unicast sidelink network.

The configured sidelink resources may include resource blocks, subchannels, resource pools, bandwidth parts (BWPs), and/or the like. A resource block, a subchannel, a resource pool, and/or a bandwidth part (BWP) may be a resource in a frequency domain and may be described with respect to a starting frequency and a bandwidth, and/or may be associated with a subcarrier spacing. In some aspects, a subchannel may include one or more resource blocks, a resource pool may include one or more subchannels, and/or a BWP may include one or more resource pools. For instance, as shown in example 500 of FIG. 5, BWP 1 may include resource pool 1, BWP 2 may include resource pool 2 and resource pool 3, and BWP 3 may include resource pool 1, resource pool 2, and resource pool 3.

A UE may utilize a BWP to conduct sidelink communication. For instance, the UE may receive control information (e.g., downlink control information (DCI)) for the UE to actively utilize a configured BWP. In some aspects, as discussed below with respect to FIGS. 6 and 7, the UE may switch from utilizing a first configured BWP to utilizing another configured BWP. As disclosed herein, the description with respect to BWPs may analogously apply to resource pools. For instance, the UE may analogously switch from utilizing a first configured resource pool to utilizing another configured resource pool.

As indicated above, FIGS. 4 and 5 are provided as examples. Other examples may differ from what is described with respect to FIGS. 4 and 5.

Figure 6:
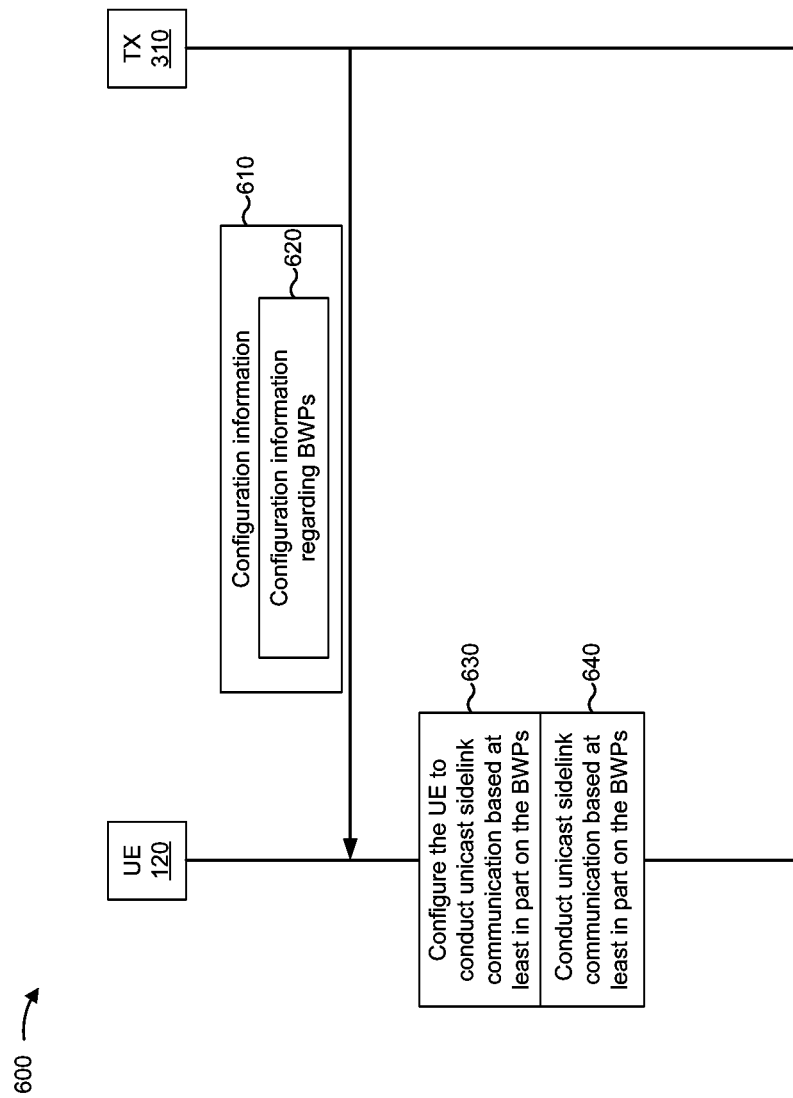
FIG. 6 is a diagram illustrating an example associated with providing bandwidth parts for a unicast sidelink network, in accordance with various aspects of the present disclosure.

FIG. 6 is a diagram illustrating an example 600 associated with providing bandwidth parts for a unicast sidelink network, in accordance with various aspects of the present disclosure. FIG. 6 shows a TX 310 (e.g., a base station or a relay device (e.g., relay UE)) and a UE 120 conducting data communication in a wireless network, such as an LTE network or a 6G/NR network. The data communication may include downlink communications from the TX 310 to the UE 120 and/or uplink communications from the UE 120 to the TX 310. The uplink and downlink communications may include, for example, signaling data and/or payload data. In some aspects, the UE 120 may operate in, for example, Mode-1 Resource Allocation Mode in which the TX 310 may configure and control utilization of sidelink resources by the UE 120 or in Mode-2 Resource Allocation Mode in which the TX 310 may configure the sidelink resources while the UE 120 may control utilization of the sidelink resources. The UE 120 may include, for example, one or more UEs discussed elsewhere herein, such as UE 120 discussed with respect to FIG. 2 and/or UEs 305-1 and 305-2 discussed with respect to FIG. 3 and/or UEs 405-1 and 405-2 discussed with respect to FIG. 4.

As shown by reference number 610, the TX 310 may transmit, and the UE 120 may receive, configuration information at a beginning of and/or during the data communication. In some aspects, the UE 120 may receive the configuration information from another device (e.g., from another base station or another UE). In some aspects, the UE 120 may receive the configuration information via, for example, radio resource control channel (RRC) signaling and/or MAC signaling (e.g., MAC CEs).

In some aspects, the configuration information may include sidelink system information and/or dedicated network signaling information to enable the UE 120 to configure the UE 120 to conduct unicast sidelink communication with, for example, one other UE. For instance, as shown by reference number 620, the configuration information may include configuration information regarding a plurality of BWPs to be utilized by the UE 120 to conduct unicast sidelink communication in a unicast sidelink network. In some aspects, the plurality of BWPs may include an initial BWP, one or more dedicated BWPs, and/or a dormant BWP.

The UE 120 may utilize the initial BWP to perform communication operations including setting up the unicast sidelink communication. The UE 120 may utilize the one or more dedicated BWPs to perform communication operations including transmitting and/or receiving data. The UE 120 may utilize the dormant BWP to perform communication operations including one or more link/connection management procedures. A BWP, from among the plurality of BWPs, actively utilized by the UE 120 may be referred to as an active BWP. In some aspects, the initial BWP or the more or more dedicated BWPs may be a default BWP, which the UE 120 may utilize when, for example, an inactivity timer expires. In some aspects, each of the initial BWP and the one or more dedicated BWPs may be associated with a respective inactivity timer.

In some aspects, each of the plurality of BWPs may be associated with respective parameters for utilizing resources of the PSSCH, the PSCCH, the PSFCH, and/or the PSBCH. In some aspects, the PSSCH may be associated with a single active BWP to enable unicast sidelink communication between the UE 120 and another UE. In some aspects, the UE 120 may be configured with a sufficient number of sidelink channels to enable the UE 120 to utilize, for example, one or more relay devices to conduct the unicast sidelink communication, with each sidelink channel associated with a respective plurality of BWPs.

As shown by reference number 630, the UE 120 may configure the UE 120 to conduct the unicast sidelink communication based at least in part on the plurality of BWPs. In some aspects, a respective number of sidelink resources (e.g., resource blocks, subchannels, and/or resource pools) may be associated with each of the plurality of BWPs, and the UE 120 may conduct the unicast sidelink communication utilizing the sidelink resources associated with each of the plurality of BWPs.

In some aspects, the UE 120 may adjust (e.g., scale up or scale down) an amount of bandwidth utilized for the unicast sidelink communication by switching the utilized BWP. For instance, the UE 120 may switch from utilizing the active BWP, actively utilized by the UE 120, to utilizing another BWP. For instance, the UE 120 may switch from utilizing the initial BWP (e.g., the active BWP) to utilizing a first one of the one or more dedicated BWPs. In another example, the UE 120 may switch from utilizing the first one of the one or more dedicated BWPs to utilizing a second one of the one or more dedicated BWPs. In some aspects, the first one of the one or more dedicated BWPs may include a same number of sidelink resources (e.g., resource blocks, subchannels, and/or resource pools) as the second one of the one or more dedicated BWPs. In other words, the first one of the one or more dedicated BWPs may be associated with a same amount of bandwidth as the second one of the one or more dedicated BWPs. In some aspects, the first one of the one or more dedicated BWPs may include a different number of sidelink resources (e.g., resource blocks, subchannels, and/or resource pools) from the second one of the one or more dedicated BWPs. In other words, the first one of the one or more dedicated BWPs may be associated with a different amount of bandwidth from the second one of the one or more dedicated BWPs.

In some aspects, the UE 120 (and/or the other UE included in the unicast sidelink network) may switch from utilizing the active BWP to utilizing another BWP based at least in part on an expiration of an inactivity timer associated with the active BWP. For instance, the UE 120 may activate the inactivity timer for a given duration of time based at least in part on, for example, a suspension of an operation associated with the unicast sidelink communication, and based at least in part on an expiration of the given duration of time, the UE 120 may switch from utilizing the active BWP to utilizing the other BWP.

In some aspects, the UE 120 (and/or the other UE included in the unicast sidelink network) may switch from utilizing the active BWP to utilizing another BWP based at least in part on a comparison of a measure of quality associated with the unicast sidelink communication with a threshold quality level. For instance, the UE 120 may periodically measure various parameters associated with the unicast sidelink communication such as, for example, a received signal strength indicator (RSSI) parameter (e.g., a sidelink-RSSI (S-RSSI) parameter), a reference signal received power (RSRP) parameter (e.g., a PSSCH-RSRP parameter), and/or a reference signal received quality (RSRQ) parameter (e.g., a PSSCH-RSRQ parameter) to determine the measure of quality associated with the unicast sidelink communication.

Based at least in part on a result of the comparison that the determined measure of quality fails to satisfy the threshold quality level, the UE 120 may switch from utilizing the active BWP to utilizing the other BWP. In some aspects, a determined measure of quality may fail to satisfy the threshold quality level when the determined measure of quality is lower than the threshold quality level. Alternatively, based at least in part on a result of the comparison that the determined measure of quality satisfies the threshold quality level by a threshold amount, the UE 120 may switch from utilizing the active BWP to utilizing the other BWP, associated with a fewer number of sidelink resources with respect to the active BWP, while maintaining a measure of quality that satisfies the threshold quality level. In this way, the UE 120 may optimize utilization of the sidelink resources.

In some aspects, the UE 120 (and/or the other UE included in the unicast sidelink network) may receive, from the TX 310, a switching message indicating the UE 120 to switch from utilizing the active BWP to utilizing another BWP. The UE 120 may receive the switching message via a network configuration message (e.g., RRC configuration message) or via a SCI message. In some aspects, the switching message may be received by each UE in the unicast sidelink network. In some aspects, the switching message may be received by each UE at substantially the same time. Alternatively, the switching message may be received by the UEs at different times.

In some aspects, the switching message may include information associated with (e.g., an index identifying) the other BWP, and the UE 120 may switch to utilizing the other BWP based at least in part on such information. In some aspects, the UE 120 may switch to utilizing the other BWP based at least in part on time information (e.g., a given time slot) included in the switching message. In an example, the UE 120 may switch to utilizing the other BWP at a beginning of, at an ending of, or during the given time slot. In some aspects, the UE 120 may switch to utilizing the other BWP based at least in part on a time associated with a time of reception of the switching message. In one example, the UE 120 may switch to utilizing the other BWP substantially upon receiving the switching message. In another example, the switching message may include a switch time (e.g., a given duration of time after receiving the switching message), and the UE 120 may switch to utilizing the other BWP based at least in part on the switch time. In some aspects, the UE 120 and/or the other UE included in the unicast sidelink network may switch to utilizing the other BWP at substantially to same time to facilitate communication without interruption or stoppage.

In some aspects, the UE 120 may transmit, based at least in part on receiving the switching message, a confirmation message or a rejection message associated with utilizing the other BWP. The UE 120 may transmit the confirmation message or the rejection message via, for example, a MAC message (e.g., MAC CE) or a HARQ message. In some aspects, transmission of the confirmation message or the rejection message may be optional, and configured as such by the TX 310. In some aspects, based at least in part on receiving the switching message, the UE 120 may transmit an assistance information message (e.g., a UE assistance information message) to a network device, such as the TX 310 or another network device associated therewith to request a BWP switch. In this case, the UE 120 may switch BWPs as a result of requesting the BWP switch (e.g., and based at least in part on communicating with the TX 310 or another network device associated therewith). In some aspects, the confirmation message may indicate that the UE 120 may switch to utilizing the other BWP, while the rejection message may indicate that the UE 120 may not switch to utilizing the other BWP. In one example, the UE 120 may not switch to utilizing the other BWP based at least in part on the other BWP being associated with communication between another transmitter (e.g., another base station) and the UE 120, which may be unknown to the TX 310. In some aspects, the UE 120 may transmit a UE assistance information (UAI) message indicating a preference of the UE 120 to utilize another (e.g., a preferred) BWP instead of utilizing the other BWP.

In the case when only one UE (e.g., relay UE) in the unicast sidelink network receives the switching message, the relay UE may relay the switching message to the other UE in the unicast sidelink network via, for example, a medium access control (MAC) message including a control element (MAC CE). In some aspects, based at least in part on receiving the relayed switching message, the other UE may transmit, to the relay UE, a confirmation message or a rejection message associated with utilizing the other BWP. The other UE may transmit the confirmation message or the rejection message via, for example, a MAC message (e.g., MAC CE) or a HARQ message. In some aspects, the confirmation message may indicate that the other UE may switch to utilizing the other BWP, while the rejection message may indicate that the other UE may not switch to utilizing the other BWP. In an example, the other UE may not switch to utilizing the other BWP based at least in part on the other BWP being associated with communication between another UE and the other UE, which may be unknown to the relay UE. In some aspects, the other UE may transmit a UE assistance information (UAI) message indicating a preference of the other UE to utilize another (e.g., a preferred) BWP instead of utilizing the other BWP. In some aspects, the relay UE and the other UE may not switch to utilizing the other BWP when a rejection message is received.

In some aspects, the UE 120 (and/or the other UE included in the unicast sidelink network) may implicitly switch from utilizing the active BWP to utilizing another BWP based at least in part on activation and/or deactivation of one or more resource pools. For instance, with respect to FIG. 5, when the UE 120 is utilizing BWP 3 as the active BWP and resource pool 3 is deactivated, the UE 120 may implicitly switch from utilizing BWP 3 to utilizing, for example, BWP 1 or another BWP not associated with resource pool 3. Similarly, when the UE 120 is utilizing BWP 1 as the active BWP and resource pool 2 and/or resource pool 3 are activated, the UE 120 may implicitly switch from utilizing BWP 1 to utilizing, for example, BWP 1 or BWP 3 or another BWP associated with resource pool 2 and/or resource pool 3.

When operating in Mode-1 Resource Allocation Mode, the activation and/or deactivation of a resource pool may be performed via, for example, SCI and/or MAC CE transmitted by TX 310. When operating in Mode-2 Resource Allocation Mode, the activation and/or deactivation of a resource pool may be performed via, for example, MAC CE transmitted by any UE in the unicast sidelink network. In some aspects, activation and/or deactivation of a resource pool may be performed in accordance with a timer. For instance, upon an expiration of the timer, a resource pool may be deactivated. Similarly, upon the expiration of the timer, a resource pool may be activated.

As shown by reference number 640, the UE 120 may conduct the unicast sidelink communication based at least in part on the plurality of BWPs, as discussed above. In some aspects, the UE 120 may conduct unicast sidelink communication by transmitting data to and/or receiving data from the other UE included in the unicast sidelink network. The UE 120 may transmit and/or receive the data by utilizing transmission circuitry and/or reception circuitry included in the UE 120. The transmission circuitry may include, for example, one or more components (e.g., transmit processor 264, TX MIMO processor 266, modulator 254, and/or antennas 252) discussed with respect to FIG. 2, and the reception circuitry may include, for example, one or more components (e.g., receive processor 258, MIMO detector 256, demodulator 254, and/or antennas 252).

In this way, by providing a plurality of BWPs for the unicast sidelink network, the UE 120 may be enabled to adjust a number of utilized sidelink resources, thereby optimizing the unicast sidelink communication. Such optimization may improve an efficiency associated with utilizing the sidelink resources as well as improve a flexibility of the UE 120 to conduct the unicast sidelink communication. Efficient utilization of the sidelink resources may also enable the UE 120 to curtail power consumption associated with performing communication operations.

As indicated above, FIG. 6 is provided as an example. Other examples may differ from what is described with respect to FIG. 6.

Figure 7:
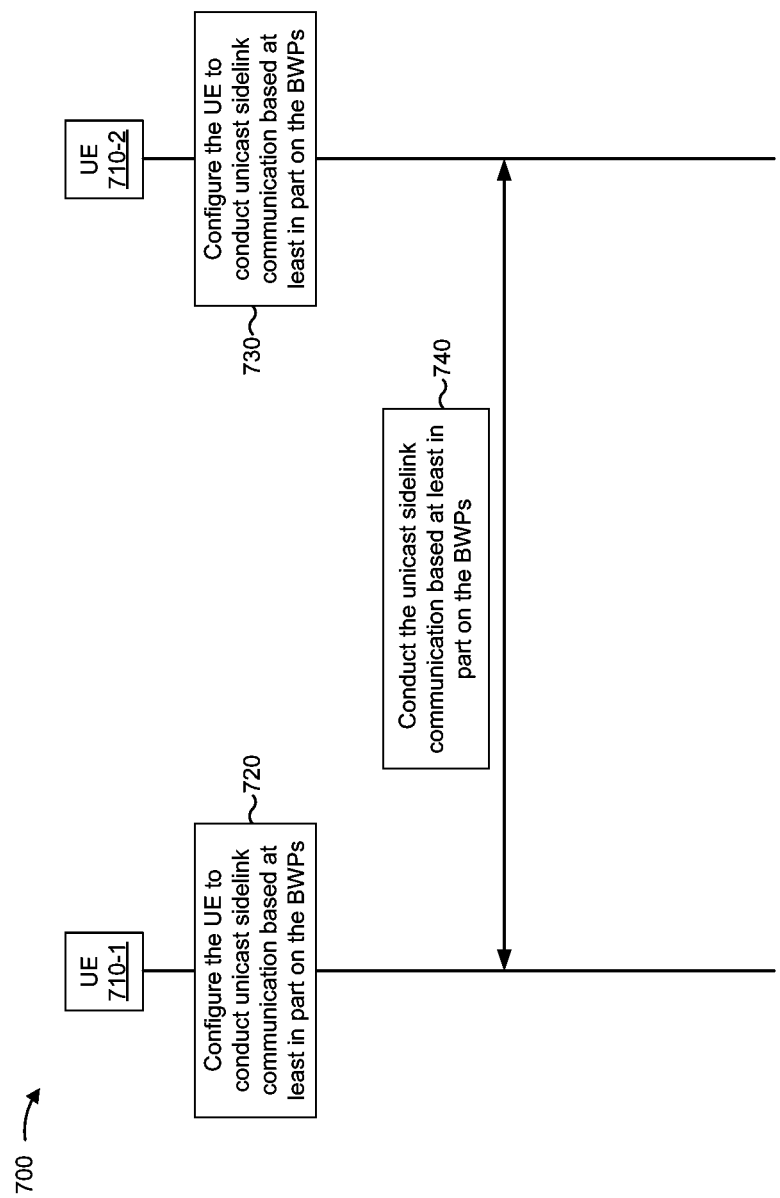
FIG. 7 is a diagram illustrating an example associated with providing bandwidth parts for a unicast sidelink network, in accordance with various aspects of the present disclosure.

FIG. 7 is a diagram illustrating an example 700 associated with providing bandwidth parts for a unicast sidelink network, in accordance with various aspects of the present disclosure. FIG. 7 shows a UE 710-1 and a UE 710-2 (collectively, the UEs 710) conducting unicast sidelink communication in a wireless network, such as an LTE network or a 5G/NR network. In some aspects, the UEs 710 may operate in, for example, a sidelink mode (e.g., Mode-2 Resource Allocation Mode) in which a transmitter (e.g., TX 310) may configure a predetermined number of sidelink resources accessible for unicast sidelink communication in the unicast sidelink network, while the UEs 710 may autonomously control utilization of the predetermined number of sidelink resources by performing resource selection for and/or scheduling of communications in the unicast sidelink network. The UEs 710 may include, for example, one or more UEs discussed elsewhere herein, such as UE 120 discussed with respect to FIG. 2 and/or FIG. 6, and/or UEs 305-1 and 305-2 discussed with respect to FIG. 3, and/or UEs 405-1 and 405-2 discussed with respect to FIG. 4.

In some aspects, the UEs 710 may receive configuration information from the transmitter at a beginning of and/or during respective data communications of the UEs 710 with the transmitter. In some aspects, the UEs 710 may receive the configuration information from another device (e.g., from another base station or another UE). In some aspects, the UEs 710 may receive the configuration information via, for example, RRC signaling and/or MAC signaling (e.g., MAC CEs).

As discussed above with respect to FIG. 6, the configuration information may include sidelink system information and/or dedicated network signaling information to enable the UEs 710 to configure the UEs 710 to conduct unicast sidelink communication with one another. Also as discussed above with respect to FIG. 6, the configuration information may include configuration information regarding a plurality of BWPs to be utilized by the UEs 710 to conduct unicast sidelink communication.

As shown by reference numbers 720 and 730, the UEs 710 may respectively configure the UEs 710 to conduct the unicast sidelink communication based at least in part on the plurality of BWPs. For instance, as discussed with respect to FIG. 6, the UEs 710 may actively utilize an initial BWP or a first one of the one or more dedicated BWPs as an active BWP to conduct the unicast sidelink communication (e.g., transmit and/or receive data). Further, as discussed with respect to FIG. 6, the UEs 710 may adjust a utilized BWP by switching from utilizing the active BWP to utilizing another BWP. For instance, the UE 710-1 and/or the UE 710-2 may switch from utilizing the active BWP to utilizing another BWP based at least in part on an expiration of an inactivity timer associated with the active BWP, in a similar manner as discussed above with respect to FIG. 6.

Further, the UE 710-1 and/or the UE 710-2 may switch from utilizing the active BWP to utilizing another BWP based at least part on a comparison of a measure of quality associated with the unicast sidelink communication with a threshold quality level, in a similar manner as discussed above with respect to FIG. 6. Additionally, or alternatively, the UE 710-1 and/or the UE 710-2 may perform carrier sensing associated with utilization of the active BWP, and may switch from utilizing the active BWP to utilizing the other BWP based at least in part on persistently observing a failure associated with the carrier sensing. In some aspects, based at least in part on persistently observing the failure, the UE 710-1 and/or the UE 710-2 may switch to the initial BWP and perform communication operations including setting up the unicast sidelink communication.

In some aspects, the UE 710-1 and/or the UE 710-2 may periodically switch from utilizing the active BWP to utilizing another BWP based at least in part on a sequence of BWPs pre-configured by the transmitter. For instance, the UE 710-1 and/or the UE 710-2 may periodically switch from utilizing the active BWP to utilizing a next BWP in the preconfigured sequence of BWPs. In some aspects, the next BWP may be pre-configured to be in a different resource pool with respect to a resource pool associated with the unicast sidelink network including the UE 710-1 and the UE 710-2. Such pre-configuration may reduce a number of contentions associated with the carrier sensing. In some aspects, a duration associated with the periodic switch may be preconfigured by the transmitter.

In some aspects, the UE 710-1 may transmit, and the UE 710-2 may receive, a switching message indicating the UE 710-2 to switch from utilizing the active BWP to utilizing another BWP. The UE 710-1 may transmit the switching message via a SCI message or via a MAC message (e.g., MAC CE). In some aspects, the switching message may include information (e.g., an index) associated with the other BWP, and the UE 710-2 may switch from utilizing the active BWP to utilizing the other BWP based at least in part on such information.

Based at least in part on the switching message, the UE 710-2 may transmit, and the UE 710-1 may receive, a confirmation message or a rejection message associated with utilizing the other BWP. The UE 120 may transmit the confirmation message or the rejection message via, for example, a MAC message (e.g., MAC CE) or a HARQ message. In some aspects, the confirmation message may indicate that the UE 710-2 may switch to utilizing the other BWP, while the rejection message may indicate that the UE 710-2 may not switch to utilizing the other BWP. In one example, the UE 710-2 may not switch to utilizing the other BWP based at least in part on the other BWP presenting, for example, a strain on a resource (e.g., processing capability) of the UE 710-2, which may be unknown to the UE 710-1. In some aspects, the UE 710-2 may transmit, and the UE 710-1 may receive, a UAI message indicating a preference of the UE 710-2 to utilize a preferred BWP instead of the other BWP.

As shown by reference number 740, the UEs 710 may conduct the unicast sidelink communication based at least in part on the plurality of BWPs, as discussed above. In some aspects, the UEs 710 may conduct unicast sidelink communication by transmitting data to and/or receiving data from each other in the unicast sidelink network. The UEs 710 may transmit and/or receive the data by utilizing included transmission circuitry and/or reception circuitry. The transmission circuitry may include, for example, one or more components (e.g., transmit processor 264, TX MIMO processor 266, modulator 254, and/or antennas 252) discussed with respect to FIG. 2, and the reception circuitry may include, for example, one or more components (e.g., receive processor 258, MIMO detector 256, demodulator 254, and/or antennas 252).

In this way, by providing a plurality of BWPs, the UEs 710 may be enabled to adjust a number of utilized sidelink resources and/or BWPs, thereby optimizing communication in the unicast sidelink network. Such optimization may improve an efficiency associated with utilizing the sidelink resources and/or BWPs as well as improve a flexibility of the UEs 710 to conduct the unicast sidelink communication. Efficient utilization of the sidelink resources may also enable the UEs 710 to curtail power consumption associated with performing communication operations.

In some aspects, the UE 710-1 may be a relay device. In this case, the UE 710-1 may be enabled to configure the plurality of BWPs for the UE 710-2. For instance, the UE 710-1 may be enabled to configure one or more dedicated BWPs and a default BWP for the UE 710-2. The UE 710-1 may provide an initial BWP associated with the UE 710-1 to the UE 710-2 for purposes of setting up a unicast sidelink network including the UE 710-1 and the UE 710-2. In such a unicast sidelink network, the UE 710-2 may or may not be able to initiate a switch from utilizing the active BWP to another BWP. In some aspects, based at least in part on the plurality of BWPs configured for the unicast sidelink network including the UE 710-1 and the UE 710-2, the UE 710-1 may request the transmitter for BWPs on an access link between the UE 710-1 and the transmitter.

As indicated above, FIG. 7 is provided as an example. Other examples may differ from what is described with respect to FIG. 7.

Figure 8:
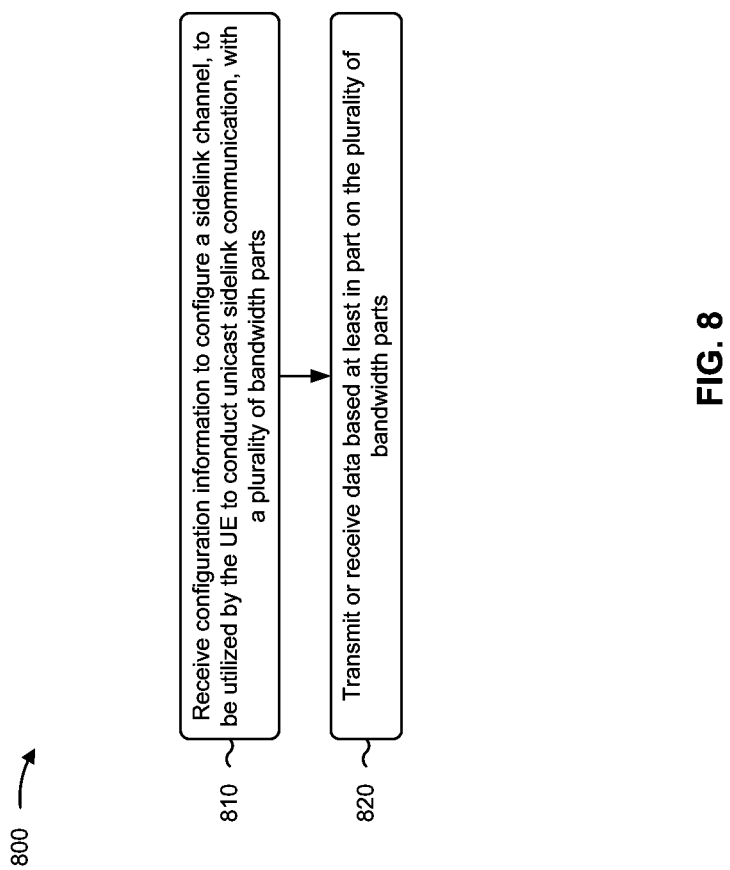
FIG. 8 is a diagram illustrating an example process associated with providing bandwidth parts for a unicast sidelink network, in accordance with various aspects of the present disclosure.

FIG. 8 is a diagram illustrating an example process 800 performed, for example, by a user equipment (UE), in accordance with various aspects of the present disclosure. Example process 800 is an example where the UE (e.g., UE 120, UE 305, UE 405, UE 710) performs operations associated with providing bandwidth parts for a unicast sidelink network.

As shown in FIG. 8, in some aspects, process 800 may include receiving configuration information to configure a sidelink channel, to be utilized by the UE to conduct unicast sidelink communication, with a plurality of bandwidth parts (block 810). For example, the UE (e.g., using reception component 902, depicted in FIG. 9) may receive configuration information to configure a sidelink channel, to be utilized by the UE to conduct unicast sidelink communication, with a plurality of bandwidth parts, as described above.

As further shown in FIG. 8, in some aspects, process 800 may include transmitting or receiving data based at least in part on the plurality of bandwidth parts (block 820). For example, the UE (e.g., using transmission component 904, depicted in FIG. 9) may transmit or receive data based at least in part on the plurality of bandwidth parts, as described above.

Process 800 may include additional aspects, such as any single aspect or any combination of aspects described below and/or in connection with one or more other processes described elsewhere herein.

In a first aspect, the configuration information includes sidelink system information or dedicated network signaling information.

In a second aspect, alone or in combination with the first aspect, the sidelink channel includes a physical sidelink shared channel (PSSCH), a physical sidelink control channel (PSCCH), a physical sidelink feedback channel (PSFCH), or a physical sidelink broadcast channel (PSBCH).

In a third aspect, alone or in combination with one or more of the first and second aspects, the sidelink channel includes a physical sidelink control channel (PSCCH) associated with an active bandwidth part.

In a fourth aspect, alone or in combination with one or more of the first through third aspects, each of the plurality of bandwidth parts is associated with a respective configuration parameter for using a sidelink resource of the sidelink channel.

In a fifth aspect, alone or in combination with one or more of the first through fourth aspects, the configuration information is received from a base station.

In a sixth aspect, alone or in combination with one or more of the first through fifth aspects, the configuration information is received from a relay device.

In a seventh aspect, alone or in combination with one or more of the first through sixth aspects, the relay device is a network node.

In an eighth aspect, alone or in combination with one or more of the first through seventh aspects, process 800 includes performing carrier sensing associated with utilization of a sidelink resource of the sidelink channel prior to transmitting or receiving the data based at least in part on the plurality of bandwidth parts.

In a ninth aspect, alone or in combination with one or more of the first through eighth aspects, the plurality of bandwidth parts includes an initial bandwidth part, one or more dedicated bandwidth parts, or a dormant bandwidth part.

In a tenth aspect, alone or in combination with one or more of the first through ninth aspects, the initial bandwidth part is associated with an initial amount of bandwidth used for setting up the unicast sidelink communication.

In an eleventh aspect, alone or in combination with one or more of the first through tenth aspects, the initial bandwidth part is associated with an inactivity timer.

In a twelfth aspect, alone or in combination with one or more of the first through eleventh aspects, the initial bandwidth part or the one or more dedicated bandwidth parts is a default bandwidth part.

In a thirteenth aspect, alone or in combination with one or more of the first through twelfth aspects, the dormant bandwidth part is associated with an amount of bandwidth utilized for performing one or more connection management procedures.

In a fourteenth aspect, alone or in combination with one or more of the first through thirteenth aspects, a bandwidth part, of the plurality of bandwidth parts, actively utilized by the UE is an active bandwidth part.

In a fifteenth aspect, alone or in combination with one or more of the first through fourteenth aspects, process 800 includes switching from utilizing an active bandwidth part, actively utilized by the UE, to utilizing another bandwidth part based at least in part on an expiration of an inactivity timer.

In a sixteenth aspect, alone or in combination with one or more of the first through fifteenth aspects, process 800 includes switching from utilizing an active bandwidth part, actively utilized by the UE, to utilizing another bandwidth part based at least in part on a measure of quality associated with the unicast sidelink communication satisfying a threshold quality level.

In a seventeenth aspect, alone or in combination with one or more of the first through sixteenth aspects, process 800 includes receiving, from a base station or a network node, a switching message for the UE to switch from utilizing an active bandwidth part, actively utilized by the UE, to utilizing another bandwidth part.

In an eighteenth aspect, alone or in combination with one or more of the first through seventeenth aspects, the switching message is received via a network reconfiguration message or via a sidelink control information (SCI) message.

In a nineteenth aspect, alone or in combination with one or more of the first through eighteenth aspects, process 800 includes switching from utilizing the active bandwidth part to utilizing the other bandwidth part based at least in part on receiving the network reconfiguration message or the SCI message.

In a twentieth aspect, alone or in combination with one or more of the first through nineteenth aspects, the SCI message includes an index associated with the other bandwidth part and an indication of a switch time, and wherein the method further comprises switching from utilizing the active bandwidth part to utilizing the other bandwidth part based at least in part on the index and the switch time.

In a twenty-first aspect, alone or in combination with one or more of the first through twentieth aspects, process 800 includes transmitting, based at least in part on receiving the switching message, an assistance information message indicating a preference to utilize a preferred bandwidth part.

In a twenty-second aspect, alone or in combination with one or more of the first through twenty-first aspects, process 800 includes transmitting, based at least in part on receiving the switching message, a confirmation message or a rejection message associated with utilizing the other bandwidth part.

In a twenty-third aspect, alone or in combination with one or more of the first through twenty-second aspects, the confirmation message or the rejection message is transmitted via a response MAC message or via a hybrid automatic repeat request (HARM) message.

In a twenty-fourth aspect, alone or in combination with one or more of the first through twenty-third aspects, process 800 includes receiving, from another UE, a switching message for the UE to switch from utilizing an active bandwidth part, actively utilized by the UE, to utilizing another bandwidth part.

In a twenty-fifth aspect, alone or in combination with one or more of the first through twenty-fourth aspects, the switching message is received based at least in part on an expiration of an inactivity timer.

In a twenty-sixth aspect, alone or in combination with one or more of the first through twenty-fifth aspects, the switching message is received based at least in part on a detected failure associated with utilization of a sidelink resource of the sidelink channel.

In a twenty-seventh aspect, alone or in combination with one or more of the first through twenty-sixth aspects, the switching message is received via a medium access control (MAC) message or via a sidelink control information (SCI) message.

In a twenty-eighth aspect, alone or in combination with one or more of the first through twenty-seventh aspects, the SCI message includes an index associated with the other bandwidth part, and wherein the method further comprises switching from utilizing the active bandwidth part to utilizing the other bandwidth part based at least in part on the index.

In a twenty-ninth aspect, alone or in combination with one or more of the first through twenty-eighth aspects, process 800 includes transmitting, based at least in part on receiving the switching message, a confirmation message or a rejection message associated with utilizing the other bandwidth part.

In a thirtieth aspect, alone or in combination with one or more of the first through twenty-ninth aspects, the confirmation message or the rejection message is transmitted via a response medium access control (MAC) message or via a hybrid automatic repeat request (HARM) feedback message.

In a thirty-first aspect, alone or in combination with one or more of the first through thirtieth aspects, process 800 includes transmitting, to another UE, a switching message for the other UE to switch from utilizing an active bandwidth part, actively utilized by the other UE, to utilizing another bandwidth part.

In a thirty-second aspect, alone or in combination with one or more of the first through thirty-first aspects, the switching message is transmitted based at least in part on an expiration of an inactivity timer.

In a thirty-third aspect, alone or in combination with one or more of the first through thirty-second aspects, the switching message is transmitted based at least in part on a failure detected while performing a carrier sensing associated with utilization of a sidelink resource of the sidelink channel.

In a thirty-fourth aspect, alone or in combination with one or more of the first through thirty-third aspects, the switching message is transmitted via a sidelink control information (SCI) message or via a medium access control (MAC) message.

In a thirty-fifth aspect, alone or in combination with one or more of the first through thirty-fourth aspects, the SCI message includes an index associated with the other bandwidth part, and wherein the method further comprises indicating to the other UE to switch from utilizing the active bandwidth part to utilizing the other bandwidth based at least in part on the index.

In a thirty-sixth aspect, alone or in combination with one or more of the first through thirty-fifth aspects, process 800 includes receiving, from the other UE, a confirmation message or a rejection message associated with utilizing the other bandwidth part.

In a thirty-seventh aspect, alone or in combination with one or more of the first through thirty-sixth aspects, the confirmation message or the rejection message is received via a response medium access control (MAC) message or via a hybrid automatic repeat request (HARM) feedback message.

In a thirty-eighth aspect, alone or in combination with one or more of the first through thirty-seventh aspects, the response MAC message indicates a preference to utilize a preferred bandwidth part.

In a thirty-ninth aspect, alone or in combination with one or more of the first through thirty-eighth aspects, each of the plurality of bandwidth parts is respectively associated with one or more resource pools.

In a fortieth aspect, alone or in combination with one or more of the first through thirty-ninth aspects, process 800 includes switching from utilizing an active bandwidth part, actively utilized by the UE, to utilizing another bandwidth part based at least in part on an activation or deactivation of a resource pool.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
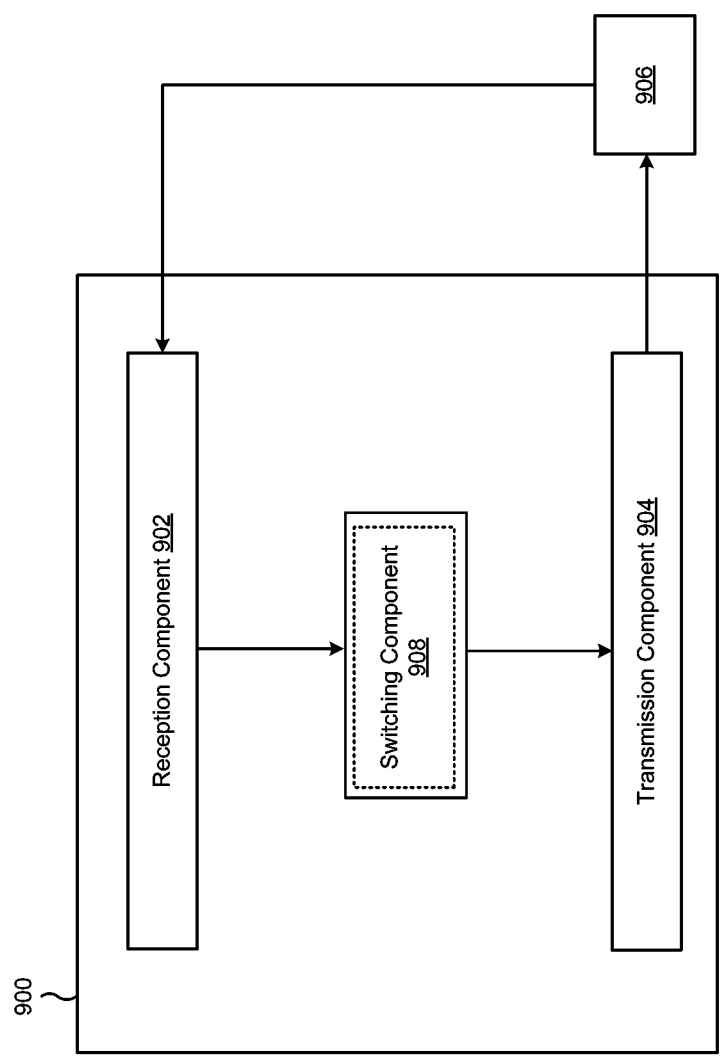
FIG. 9 is a diagram illustrating an example apparatus associated with providing bandwidth parts for a unicast sidelink network, in accordance with various aspects of the present disclosure.

FIG. 9 is a block diagram of an example apparatus 900 for wireless communication. The apparatus 900 may be a UE (e.g. UE 120, UE 305, UE 405, and/or UE 710), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a switching component 908, among other examples.

In some aspects, the apparatus 900 may be configured to perform one or more operations described herein in connection with FIGS. 3-6. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the user equipment (UE) described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the user equipment (UE) described above in connection with FIG. 2. In some aspects, the transmission component 904 may be co-located with the reception component 902 in a transceiver.

The reception component 902 may receive configuration information to configure a sidelink channel, to be utilized by the UE to conduct unicast sidelink communication, with a plurality of bandwidth parts. The transmission component 904 may transmit or receive data based at least in part on the plurality of bandwidth parts.

The switching component 908 may perform carrier sensing associated with utilization of a sidelink resource of the sidelink channel prior to transmitting or receiving the data based at least in part on the plurality of bandwidth parts.

The switching component 908 may switch from utilizing an active bandwidth part, actively utilized by the UE, to utilizing another bandwidth part based at least in part on an expiration of an inactivity timer.

The switching component 908 may switch from utilizing an active bandwidth part, actively utilized by the UE, to utilizing another bandwidth part based at least in part on a measure of quality associated with the unicast sidelink communication satisfying a threshold quality level.

The reception component 902 may receive, from a base station or a network node, a switching message for the UE to switch from utilizing an active bandwidth part, actively utilized by the UE, to utilizing another bandwidth part.

The switching component 908 may switch from utilizing the active bandwidth part to utilizing the other bandwidth part based at least in part on receiving the network reconfiguration message or the SCI message.

The transmission component 904 may transmit, based at least in part on receiving the switching message, an assistance information message indicating a preference to utilize a preferred bandwidth part.

The transmission component 904 may transmit, based at least in part on receiving the switching message, a confirmation message or a rejection message associated with utilizing the other bandwidth part.

The reception component 902 may receive, from another UE, a switching message for the UE to switch from utilizing an active bandwidth part, actively utilized by the UE, to utilizing another bandwidth part.

The transmission component 904 may transmit, based at least in part on receiving the switching message, a confirmation message or a rejection message associated with utilizing the other bandwidth part.

The transmission component 904 may transmit, to another UE, a switching message for the other UE to switch from utilizing an active bandwidth part, actively utilized by the other UE, to utilizing another bandwidth part.

The reception component 902 may receive, from the other UE, a confirmation message or a rejection message associated with utilizing the other bandwidth part.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising: receiving configuration information to configure a sidelink channel, to be utilized by the UE to conduct unicast sidelink communication, with a plurality of bandwidth parts; and transmitting or receiving data based at least in part on the plurality of bandwidth parts.

Aspect 2: The method of aspect 1, wherein the configuration information includes sidelink system information or dedicated network signaling information.

Aspect 3: The method of any of aspect 1-2, wherein the sidelink channel includes a physical sidelink shared channel (PSSCH), a physical sidelink control channel (PSCCH), a physical sidelink feedback channel (PSFCH), or a physical sidelink broadcast channel (PSBCH).

Aspect 4: The method of any of aspect 1-3, wherein the sidelink channel includes a physical sidelink control channel (PSCCH) associated with an active bandwidth part.

Aspect 6: The method of any of aspect 1-4, wherein each of the plurality of bandwidth parts is associated with a respective configuration parameter for using a sidelink resource of the sidelink channel.

Aspect 6: The method of any of aspect 1-5, wherein the configuration information is received from a base station.

Aspect 7: The method of any of aspect 1-5, wherein the configuration information is received from a relay device.

Aspect 8: The method of any of aspect 1-5 and 7, wherein the relay device is a network node.

Aspect 9: The method of any of aspect 1-8, further comprising: performing carrier sensing associated with utilization of a sidelink resource of the sidelink channel prior to transmitting or receiving the data based at least in part on the plurality of bandwidth parts.

Aspect 10: The method of any of aspect 1-9, wherein the plurality of bandwidth parts includes an initial bandwidth part, one or more dedicated bandwidth parts, or a dormant bandwidth part.

Aspect 11: The method of aspect 10, wherein the initial bandwidth part is associated with an initial amount of bandwidth used for setting up the unicast sidelink communication.

Aspect 12: The method of aspect 10, wherein the initial bandwidth part is associated with an inactivity timer.

Aspect 13: The method of aspect 10, wherein the initial bandwidth part or the one or more dedicated bandwidth parts is a default bandwidth part.

Aspect 14: The method of aspect 10, wherein the dormant bandwidth part is associated with an amount of bandwidth utilized for performing one or more connection management procedures.

Aspect 15: The method of any of aspect 1-14, wherein a bandwidth part, of the plurality of bandwidth parts, actively utilized by the UE is an active bandwidth part.

Aspect 16: The method of any of aspect 1-15, further comprising: switching from utilizing an active bandwidth part, actively utilized by the UE, to utilizing another bandwidth part based at least in part on an expiration of an inactivity timer.

Aspect 17: The method of any of aspect 1-16, further comprising: switching from utilizing an active bandwidth part, actively utilized by the UE, to utilizing another bandwidth part based at least in part on a measure of quality associated with the unicast sidelink communication satisfying a threshold quality level.

Aspect 18: The method of any of aspect 1-17, further comprising: receiving, from a base station or a network node, a switching message for the UE to switch from utilizing an active bandwidth part, actively utilized by the UE, to utilizing another bandwidth part.

Aspect 19: The method of aspect 18, wherein the switching message is received via a network reconfiguration message or via a sidelink control information (SCI) message.

Aspect 20: The method of aspect 19, further comprising: switching from utilizing the active bandwidth part to utilizing the other bandwidth part based at least in part on receiving the network reconfiguration message or the SCI message.

Aspect 21: The method of aspect 19, wherein the SCI message includes an index associated with the other bandwidth part and an indication of a switch time, and wherein the method further comprises: switching from utilizing the active bandwidth part to utilizing the other bandwidth part based at least in part on the index and the switch time.

Aspect 22: The method of aspect 18, further comprising: transmitting, based at least in part on receiving the switching message, an assistance information message indicating a preference to utilize a preferred bandwidth part.

Aspect 23: The method of aspect 18, further comprising: transmitting, based at least in part on receiving the switching message, a confirmation message or a rejection message associated with utilizing the other bandwidth part.

Aspect 24: The method of aspect 23, wherein the confirmation message or the rejection message is transmitted via a response medium access control (MAC) message or via a hybrid automatic repeat request (HARQ) message.

Aspect 25: The method of any of aspect 1-24, further comprising: receiving, from another UE, a switching message for the UE to switch from utilizing an active bandwidth part, actively utilized by the UE, to utilizing another bandwidth part.

Aspect 26: The method of aspect 25, wherein the switching message is received based at least in part on an expiration of an inactivity timer.

Aspect 27: The method of aspect 25, wherein the switching message is received based at least in part on a detected failure associated with utilization of a sidelink resource of the sidelink channel.

Aspect 28: The method of aspect 25, wherein the switching message is received via a medium access control (MAC) message or via a sidelink control information (SCI) message.

Aspect 29: The method of aspect 28, wherein the SCI message includes an index associated with the other bandwidth part, and wherein the method further comprises: switching from utilizing the active bandwidth part to utilizing the other bandwidth part based at least in part on the index.

Aspect 30: The method of aspect 25, further comprising: transmitting, based at least in part on receiving the switching message, a confirmation message or a rejection message associated with utilizing the other bandwidth part.

Aspect 31: The method of aspect 30, wherein the confirmation message or the rejection message is transmitted via a response medium access control (MAC) message or via a hybrid automatic repeat request (HARQ) feedback message.

Aspect 32: The method of any of aspect 1-31, further comprising: transmitting, to another UE, a switching message for the other UE to switch from utilizing an active bandwidth part, actively utilized by the other UE, to utilizing another bandwidth part.

Aspect 33: The method of aspect 32, wherein the switching message is transmitted based at least in part on an expiration of an inactivity timer.

Aspect 34: The method of aspect 32, wherein the switching message is transmitted based at least in part on a failure detected while performing a carrier sensing associated with utilization of a sidelink resource of the sidelink channel.

Aspect 35: The method of aspect 32, wherein the switching message is transmitted via a sidelink control information (SCI) message or via a medium access control (MAC) message.

Aspect 36: The method of aspect 35, wherein the SCI message includes an index associated with the other bandwidth part, and wherein the method further comprises: indicating to the other UE to switch from utilizing the active bandwidth part to utilizing the other bandwidth based at least in part on the index.

Aspect 37: The method of aspect 32, further comprising: receiving, from the other UE, a confirmation message or a rejection message associated with utilizing the other bandwidth part.

Aspect 38: The method of aspect 37, wherein the confirmation message or the rejection message is received via a response medium access control (MAC) message or via a hybrid automatic repeat request (HARM) feedback message.

Aspect 39: The method of aspect 38, wherein the response MAC message indicates a preference to utilize a preferred bandwidth part.

Aspect 40: The method of any of aspect 1-39, wherein each of the plurality of bandwidth parts is respectively associated with one or more resource pools.

Aspect 41: The method of any of aspect 1-40, further comprising switching from utilizing an active bandwidth part, actively utilized by the UE, to utilizing another bandwidth part based at least in part on an activation or deactivation of a resource pool.

Aspect 42: An apparatus for wireless communication at a device, comprising a processor; memory coupled with the processor; and instructions stored in the memory and executable by the processor to cause the apparatus to perform the method of one or more aspects of aspect 1-41.

Aspect 43: A device for wireless communication, comprising a memory and one or more processors coupled to the memory, the memory and the one or more processors configured to perform the method of one or more aspects of aspect 1-41.

Aspect 44: An apparatus for wireless communication, comprising at least one means for performing the method of one or more aspects of aspect 1-41.

Aspect 44: A non-transitory computer-readable medium storing code for wireless communication, the code comprising instructions executable by a processor to perform the method of one or more aspects of aspect 1-41.

Aspect 45: A non-transitory computer-readable medium storing a set of instructions for wireless communication, the set of instructions comprising one or more instructions that, when executed by one or more processors of a device, cause the device to perform the method of one or more aspects of aspect 1-41.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
receive configuration information to configure a sidelink channel with a plurality of unicast bandwidth parts to be utilized by the UE to conduct unicast sidelink communication with another UE; and
transmit or receive data in a unicast bandwidth part of the plurality of unicast bandwidth parts, wherein the unicast bandwidth part is selected based at least in part on an activation of a resource pool associated with the unicast bandwidth part.

2. The UE of claim 1, wherein each of the plurality of unicast bandwidth parts is respectively associated with one or more resource pools.

3. The UE of claim 1, wherein the one or more processors are further configured to:
switch from utilizing an active unicast bandwidth part, actively utilized by the UE, to utilizing another unicast bandwidth part based at least in part on an activation or deactivation of an associated resource pool.

4. The UE of claim 1, wherein the one or more processors are further configured to:
switch from utilizing an active unicast bandwidth part, actively utilized by the UE, to utilizing another unicast bandwidth part based at least in part on a measure of quality associated with the unicast sidelink communication satisfying a threshold quality level.

5. The UE of claim 1, wherein the one or more processors are further configured to:
receive, from a base station or a network node, a switching message for the UE to switch from utilizing an active unicast bandwidth part, actively utilized by the UE, to utilizing another unicast bandwidth part.

6. The UE of claim 5, wherein the switching message includes an index associated with the other unicast bandwidth part and an indication of a switch time, and
wherein the one or more processors are further configured to:
switch from utilizing the active unicast bandwidth part to utilizing the other unicast bandwidth part based at least in part on the index and the switch time.

7. The UE of claim 5, wherein the one or more processors are further configured to:
transmit, based at least in part on receiving the switching message, a confirmation message or a rejection message associated with utilizing the other unicast bandwidth part.

8. The UE of claim 1, wherein the one or more processors are further configured to:
receive, from a base station or a network node, a switching message to switch from utilizing an active unicast bandwidth part to utilizing another unicast bandwidth part, and
transmit the switching message to another UE conducting the unicast sidelink communication.

9. The UE of claim 1, wherein the one or more processors are further configured to:
transmit, based at least in part on receiving a switching message, an assistance information message indicating a preference to utilize a preferred unicast bandwidth part.

10. The UE of claim 1, wherein the one or more processors are further configured to:
receive, from another UE, a switching message for the UE to switch from utilizing an active unicast bandwidth part, actively utilized by the UE, to utilizing another unicast bandwidth part.

11. The UE of claim 10, wherein the one or more processors are further configured to:
transmit, based at least in part on receiving the switching message, a confirmation message or a rejection message associated with utilizing the other unicast bandwidth part.

12. The UE of claim 1, wherein the one or more processors are further configured to:
transmit, to another UE, a switching message for the other UE to switch from utilizing an active unicast bandwidth part, actively utilized by the other UE, to utilizing another unicast bandwidth part.

13. The UE of claim 12, wherein the one or more processors are further configured to:
receive, from the other UE, a confirmation message or a rejection message associated with utilizing the other unicast bandwidth part.

14. A method of wireless communication performed by a user equipment (UE), comprising:
receiving configuration information to configure a sidelink channel with a plurality of unicast bandwidth parts to be utilized by the UE to conduct unicast sidelink communication with another UE; and
transmitting or receiving data in a unicast bandwidth part of the plurality of unicast bandwidth parts, wherein the unicast bandwidth part is selected based at least in part on an activation of a resource pool associated with the unicast bandwidth part.

15. The method of claim 14, wherein each of the plurality of unicast bandwidth parts is respectively associated with one or more resource pools.

16. The method of claim 14, further comprising:
switching from utilizing an active unicast bandwidth part, actively utilized by the UE, to utilizing another unicast bandwidth part based at least in part on an activation or deactivation of an associated resource pool.

17. The method of claim 14, further comprising:
switching from utilizing an active unicast bandwidth part, actively utilized by the UE, to utilizing another unicast bandwidth part based at least in part on a measure of quality associated with the unicast sidelink communication satisfying a threshold quality level.

18. The method of claim 14, further comprising:
receiving, from a base station or a network node, a switching message for the UE to switch from utilizing an active unicast bandwidth part, actively utilized by the UE, to utilizing another unicast bandwidth part.

19. The method of claim 18, wherein the switching message includes an index associated with the other unicast bandwidth part and an indication of a switch time, and wherein the method further comprises:
switching from utilizing the active unicast bandwidth part to utilizing the other unicast bandwidth part based at least in part on the index and the switch time.

20. The method of claim 18, further comprising:
transmitting, based at least in part on receiving the switching message, a confirmation message or a rejection message associated with utilizing the other unicast bandwidth part.

21. The method of claim 14, further comprising:
receiving, from a base station or a network node, a switching message to switch from utilizing an active unicast bandwidth part to utilizing another unicast bandwidth part, and
transmitting the switching message to another UE conducting the unicast sidelink communication.

22. The method of claim 14, further comprising:
transmitting, based at least in part on receiving a switching message, an assistance information message indicating a preference to utilize a preferred unicast bandwidth part.

23. The method of claim 14, further comprising:
receiving, from another UE, a switching message for the UE to switch from utilizing an active unicast bandwidth part, actively utilized by the UE, to utilizing another unicast bandwidth part.

24. The method of claim 23, further comprising:
transmitting, based at least in part on receiving the switching message, a confirmation message or a rejection message associated with utilizing the other unicast bandwidth part.

25. The method of claim 14, further comprising:
transmitting, to another UE, a switching message for the other UE to switch from utilizing an active unicast bandwidth part, actively utilized by the other UE, to utilizing another unicast bandwidth part.

26. The method of claim 25, further comprising:
receiving, from the other UE, a confirmation message or a rejection message associated with utilizing the other unicast bandwidth part.

27. A non-transitory computer-readable medium storing a set of instructions for wireless communication, the set of instructions comprising:
one or more instructions that, when executed by one or more processors of a user equipment (UE), cause the UE to:
receive configuration information to configure a sidelink channel with a plurality of unicast bandwidth parts to be utilized by the UE to conduct unicast sidelink communication with another UE; and
transmit or receive data in a unicast bandwidth part of the plurality of unicast bandwidth part, wherein the unicast bandwidth part is selected based at least in part on an activation of a resource pool associated with the unicast bandwidth part.

28. The non-transitory computer-readable medium of claim 27, wherein each of the plurality of unicast bandwidth parts is respectively associated with one or more resource pools.

29. An apparatus for wireless communication, comprising:
means for receiving configuration information to configure a sidelink channel with a plurality of unicast bandwidth parts to be utilized by the apparatus to conduct unicast sidelink communication with another apparatus; and
means for transmitting or receiving data in a unicast bandwidth part of the plurality of unicast bandwidth parts, wherein the unicast bandwidth part is selected based at least in part on an activation of a resource pool associated with the unicast bandwidth part.

30. The apparatus of claim 29, wherein each of the plurality of unicast bandwidth parts is respectively associated with one or more resource pools.

* * * * *